US012503824B1

(12) United States Patent
Gates

(10) Patent No.: US 12,503,824 B1
(45) Date of Patent: Dec. 23, 2025

(54) TIE-BACK ROD BRACKET

(71) Applicant: Donald Gates, Fort Walton Beach, FL (US)

(72) Inventor: Donald Gates, Fort Walton Beach, FL (US)

( * ) Notice: Subject to any disclaimer, the term of this patent is extended or adjusted under 35 U.S.C. 154(b) by 259 days.

(21) Appl. No.: 18/136,918

(22) Filed: Apr. 20, 2023

Related U.S. Application Data

(60) Provisional application No. 63/438,301, filed on Jan. 11, 2023.

(51) Int. Cl.
*E02D 5/54* (2006.01)

(52) U.S. Cl.
CPC ..................... *E02D 5/54* (2013.01)

(58) Field of Classification Search
CPC .................. E02D 5/54; F16B 9/054
See application file for complete search history.

(56) References Cited

U.S. PATENT DOCUMENTS

| 743,640 | A | * | 11/1903 | Harmon | ..................... E06C 7/08 182/216 |
| 816,097 | A | * | 3/1906 | Hunter | ..................... F16B 9/052 403/197 |
| 2007/0227082 | A1 | * | 10/2007 | Morton | ............... E04G 23/0218 52/127.2 |

FOREIGN PATENT DOCUMENTS

KR 100534213 B1 * 12/2005
WO WO-2004009912 A1 * 1/2004 ............... E02D 5/16

* cited by examiner

*Primary Examiner* — Kyle Armstrong
(74) *Attorney, Agent, or Firm* — Peter Loffler

(57) ABSTRACT

A tie-back piling system uses a bracket that is secured to a tie-back piling. The bracket has a central opening and a nut that is fixedly attached to the bracket, the opening of the nut corresponding to the bracket's opening. A tie-back rod passes through the bracket opening and threadably through the nut. The opposing end of the tie-back rod passes through a seawall and its piling such that a second nut is threadably attached to this second end. This second nut is tightened until it presses against the seawall piling in order to tension the rod. Irrespective of the rotation of the second nut about the tie-back rod, and its own residual rotation therefrom, the first nut remains in proper position for tensioning purposes against the bracket.

4 Claims, 5 Drawing Sheets

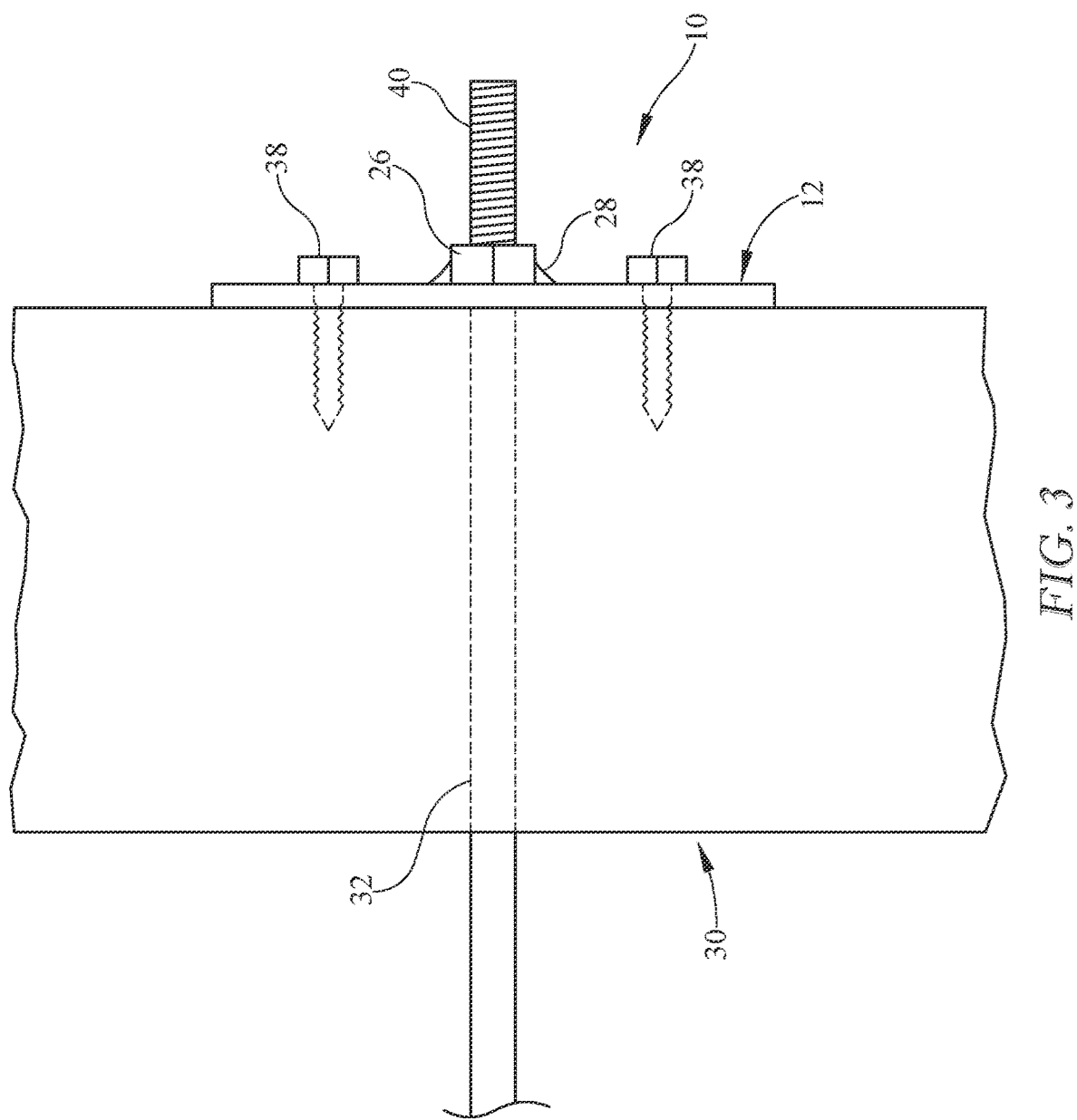

TIE-BACK ROD BRACKET

This application claims the benefit of U.S. provisional patent application No. 63/438,301 filed on Jan. 11, 2023, which provisional application is incorporated herein in its entirety.

BACKGROUND OF THE INVENTION

1. Field of the Invention

The present invention relates to a bracket for securing a tie-back rod to a tie back piling so as to allow the tensioning of the tie-back rod to be accomplished from the seawall piling end of the rod without the need to also have access to the tie-back piling end of the tie-back rod.

2. Background of the Prior Art

A tie-back is a structural element that is anchored into the ground in order transfer an applied tensile force acting on a cantilevered wall into the ground. The tie-back typically takes the form of a generally horizontally disposed rod or wire (or near horizontally disposed, typically oriented about 15-45 degrees off horizontal) that is secured to the wall at one end with the opposing end of the tie-back anchored into the ground via a deadman or similar structure. The tie-back resists the forces that act on the wall in order to help prevent the wall from leaning as a result of such forces.

In the case of seawall construction, the tie-back is used to help resist the tensile forces that act on the landward side of the wall such as forces occasioned from trapped water between the land and the seawall. The tie-back has one end secured to a piling of the seawall and the opposing end anchored within the landward side soil, the anchoring typically being in the form of a tie-back piling that is sunk within the ground. Properly installed, the tie-back provides substantial strength to the seawall and helps prevent the seawall from leaning or even failing, even under harsh loading. Such seawall strength also helps prevent soil leech on the landward side of the seawall.

The problem with current seawall tie-back construction occurs when there is a need to adjust the tensioning of the tie-back rod after installation. As time progresses, the tensioning on the tie-back rod becomes slack and the tie-back rod needs to be retensioned in order to provide effective force transfer. The slacking or loosening of the tie-back rod occurs through normal geodynamic and hydrodynamic forces acting on the various components of the system. Once the tie-back rod is sufficiently loose, it needs to be retensioned, which, under current methods of construction, poses challenges.

In order to install a seawall based tie-back, an appropriate hole is dug into the ground in order to sink and anchor the tie-back piling landward of the seawall. Anchoring of the tie-back piling is in any appropriate manner known such as via concrete encasement at the base. Thereafter, the tie-back rod is passed through an opening on the seawall piling and a corresponding opening on the tie-back piling. As mentioned previously, the tie-back rod may be oriented anywhere from substantially horizontal to about 45 degrees from horizontal. When the tie-rod is so positioned, its ends—the ends that protrude out the back side of the respective pilings—are threaded (the entire tie-back rod may be threaded). A nut is threadably attached to the end of the tie-back rod that extends beyond the tie-back piling until the nut is in pressing engagement with the tie-back piling. Thereafter, a second nut is threadably attached to the end of the tie-back rod that extends beyond the seawall piling. The first nut, the nut pressing against the tie-back piling, is held by one worker while the second nut, the nut at the seawall piling is rotated toward the seawall piling—the first nut needs to be held, otherwise, when the second nut is threaded onto the tie-back rod and tightened, the rod spins which spinning removes the first nut out of its pressing engagement with the tie-back piling. This second nut is rotated until it presses against the seawall piling. With each nut pressed against its respective piling, the tie-back rod is fixed between the two pilings (cannot move back and forth) and is thereby tensioned between the two pilings. Thereafter, the tie-back piling is ground covered in desired fashion and the seawall, at least at this seawall piling is ready for duty. Each tie-back rod used on the seawall is similarly tensioned.

When retensioning is desired, due to geodynamic and hydrodynamic forces being occasioned onto the various components of the system, it is not simply a matter of retightening the nut at the seawall piling. Rotation of this nut in order to tighten it against the seawall piling causes the tie-back rod to rotate which in turn causes the nut at the tie-back piling to rotate away from the tie-back piling, its needed position, thereby impacting no increase in tensioning onto the tie-back rod. The nut at the tie-back piling must be held fast during rotation of the nut at the seawall piling in order to properly retension the tie-back rod. In order to do this, the ground must be dug up around the tie-back piling in order to access the tie-back piling, specifically the nut on the tie-back rod at the tie-back piling.

This process is time-consuming and labor intensive and often equipment intensive and is quite disruptive to the area around the seawall, especially if a permanent or semi-permanent structure is located above the tie-back piling. Nevertheless, the process must be performed in order to maintain proper structural integrity of the seawall.

What is needed is a system whereby a tie-back rod of a seawall system can be tensioned as needed without the need to access the tie-back piling once the tie-back piling is sunk within and covered by the ground. Such a system must allow such tensioning to occur without the need to directly access the tie-back piling or the nut on the tie-back rod thereat so as not to disturb the soil around or above the tie-back piling. Such a system must allow a single worker to be able to quickly and easily retension a tie-back rod as needed.

SUMMARY OF THE INVENTION

The tie-back rod bracket of the present invention addresses the aforementioned needs in the art by providing a device that is located at, and attached to a tie-back piling and that receives a tie-back rod therethrough. The tie-back rod bracket, once installed and in receipt of the tie-back rod, requires not further attention, either for the device proper or for the portion of the tie-back rod received thereat. The tie-back rod bracket allows the tie-back piling and the received portion of the tie-back rod to be buried as desired once initially installed without the need to unearth the device once retensioning of the tie-back rod is required. The tie-back rod bracket allows a single worker to retension the tie-back rod as needed without any disruption of the ground area around or above the tie-back piling. This quick and easy method of retensioning of the tie-back rod permits more frequent retensioning of the tie-back rod in order to provide maximum structural support for the seawall.

The tie-back rod bracket is comprised of a bracket that has front face and a corresponding rear face. The bracket has a central opening. The bracket is attached to a tie-back piling which is anchored within the ground, below the top surface of the ground. The tie-back piling has a tie-back piling opening passing therethrough. When the bracket is secured to the tie-back piling, the central opening of the bracket corresponds with the tie-back piling opening. A threaded nut has a nut opening and is fixedly attached to the front face of the bracket such that the nut opening corresponds with the central opening of the bracket. A threaded tie-back rod has a portion thereof that passes through the tie-back piling opening of the tie-back piling, through the central opening of the bracket, and threadably through the nut opening of the nut. The nut may be welded (MIG or TIG) to the front face of the bracket. Alternately, the bracket and the nut can be formed as a single integral unit which may be monolithic. The bracket may be secured to the tie-back piling by passing one or more lag bolts through the bracket and into the tie-back piling.

BRIEF DESCRIPTION OF THE DRAWINGS

FIG. 3 is a side sectioned view of FIG. 2.

Similar reference numerals refer to similar parts throughout the several views of the drawings.

DESCRIPTION OF THE PREFERRED EMBODIMENT

Figure 1:
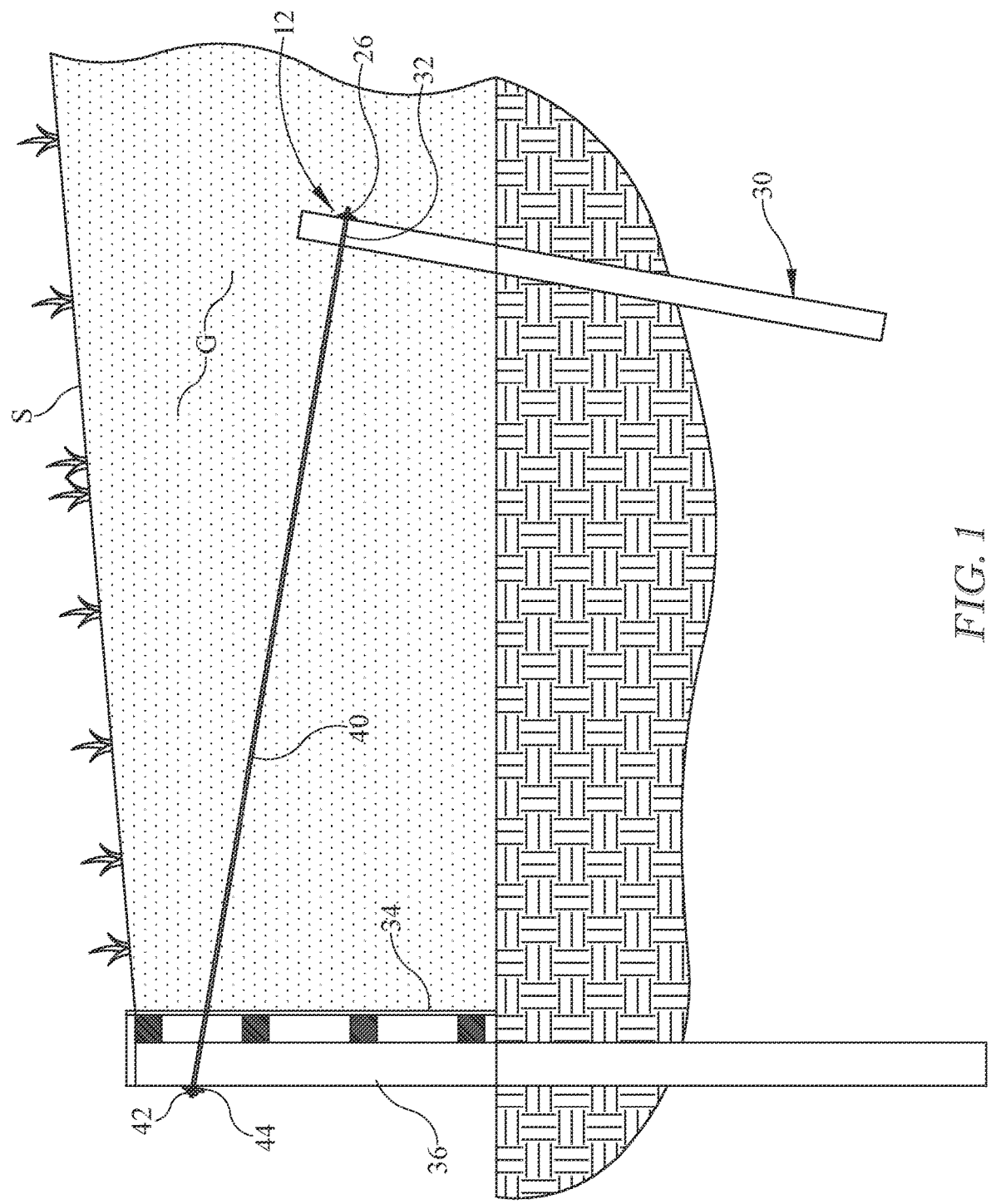
FIG. 1 is an environmental view of the tie-back rod bracket of the present invention installed within a tensioning system of a seawall.
Figure 2:
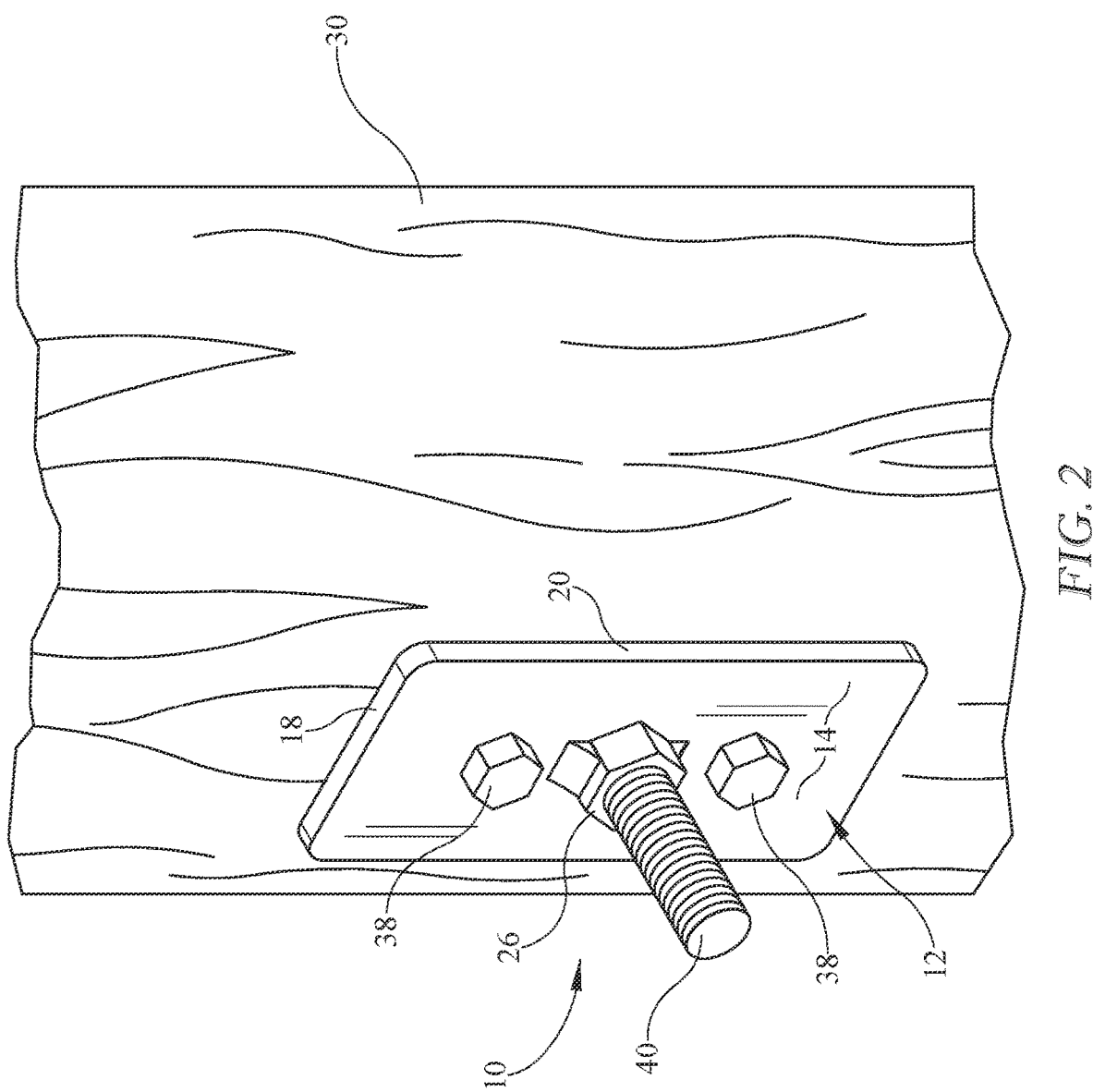
FIG. 2 is a perspective view of the tie-back rod bracket attached to a tie-back piling.
Figure 7:
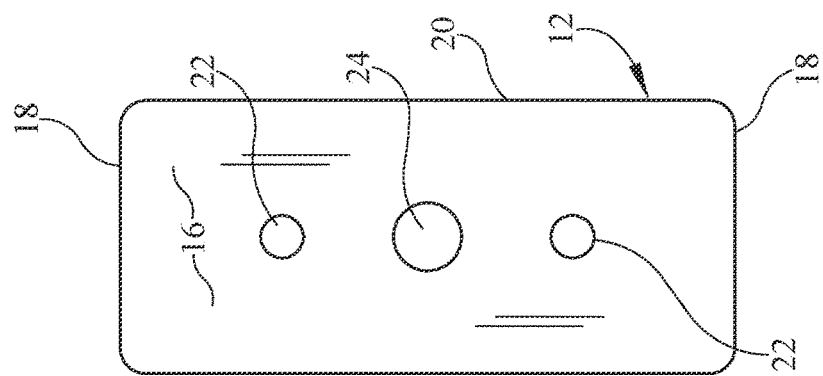
FIG. 7 is a back view of the tie-back rod bracket.
Figure 6:
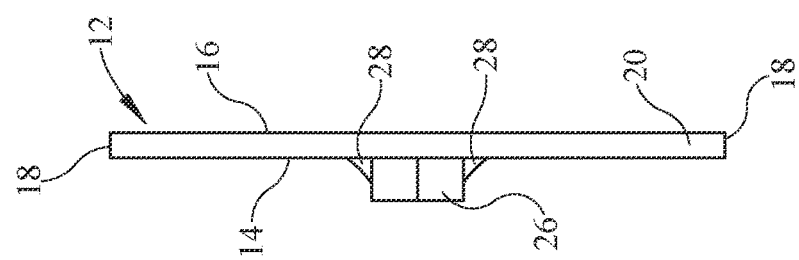
FIG. 6 is a side view of the tie-back rod bracket.
Figure 8:
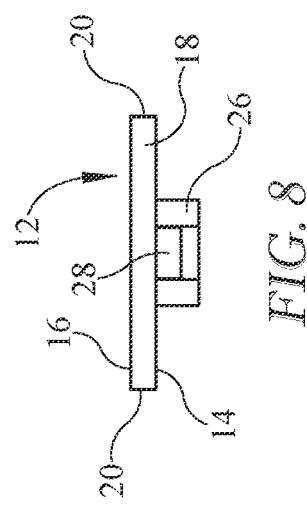
FIG. 8 is a top view of the tie-back rod bracket.
Figure 5:
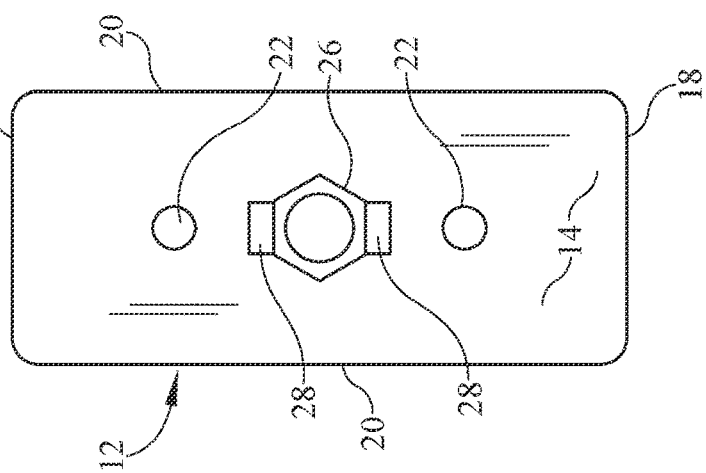
FIG. 5 is a front view of the tie-back rod bracket.
Figure 4:
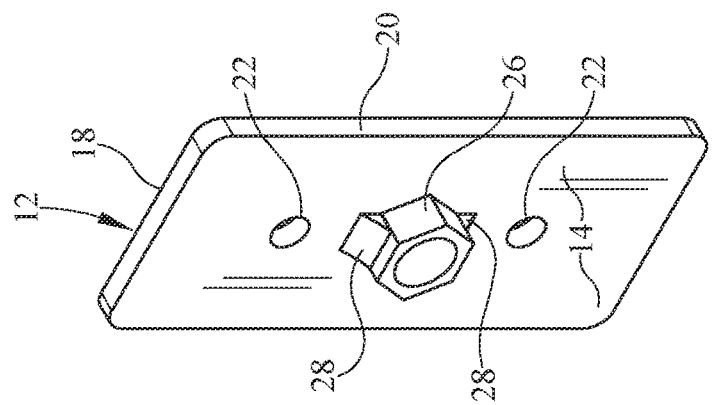
FIG. 4 is a perspective view of the tie-back rod bracket.

Referring now to the drawings, it is seen that the tie-back rod bracket of the present invention, generally denoted by reference numeral 10, is comprised of a bracket 12 that is a plate member and that has a front face 14 and a relatively flat rear face 16 and also has a pair of ends 18 joined by a pair of sides 20. The bracket 12 has a pair of bracket openings 22. The bracket 12 has a central opening 24. The bracket 12 is made from any appropriate material such as aluminum, steel, which may be coated appropriately such as zinc coating, stainless steel, etc. A first threaded nut 26 is positioned on the front face 14 of the bracket 12 such that the opening of the first nut 26 corresponds with the central opening 24 of the bracket 12. The first nut 26 is fixedly attached to the front face 14 of the bracket in appropriate fashion such as via the illustrated welding 28 in order to hold the first nut 26 in fixed relationship with the bracket 12. The first nut 26 is made from the same or similar materials used to make the bracket 12.

A tie-back piling 30 is anchored within the ground G in appropriate fashion below the ground's surface S as is well known in the art of seawall anchoring. The tie-back piling 30 has a tie-back piling opening 32 passing therethrough. The tie-back piling 30 is positioned so that its tie-back piling opening 32 corresponds with openings located on a seawall 34 positioned seaward of the tie-back piling 30 and a seawall piling 36 attached to the seawall 34. The bracket 12 is positioned on the landward facing side of tie-back piling 30 so that the bracket's central opening 24, and thus the first nut's opening, correspond with the tie-back piling opening 32. The bracket 12 is attached to the tie-back piling 30 by placing the rear face 16 of the bracket 12 against the tie-back piling 30. Attachment of the bracket 12 to the tie-back piling 30 is in any appropriate fashion such as by passing the illustrated lag bolts 38 through the bracket openings 22 and into the tie-back piling 30. A threaded tie-back rod 40 (the threading may only be on the ends of the rod or substantially along its entire length) is passed through the openings on the seawall piling 36 and the seawall 34 and through the tie-back piling opening 32 and then threadably through the first nut 26 so that at least a portion of the tie-back rod 40, however small, extends beyond the first nut 26. A second nut 42 is threadably attached to the opposing end of the tie-back rod 40—the end protruding seaward from the seawall piling 36. This second nut 42 is tightened until it is in pressing engagement with the seawall piling 36. As the tie-back rod 40 may rotate during the tightening of the second nut 42, the fact that the first nut 26 is fixedly attached to the bracket 12 prevents the first nut 26 from being rotated out of position against the bracket 12 with tie-back rod 40 rotation. Once the second nut 42 is positioned against the seawall piling 36 (a washer 44 may be positioned about the tie-back rod 40 between the second nut 42 and the seawall piling 36), the tie-back rod 40 is tensioned between the seawall structure and the tieback piling 30.

If the second nut 42 loosens over time, it is simply retightened as the first nut 26 will remain in its proper position pressed against the bracket 12 at all times, irrespective of tie-back rod 40 rotation, thereby making tie-back rod 40 tension maintenance relatively easy.

Figure 9:
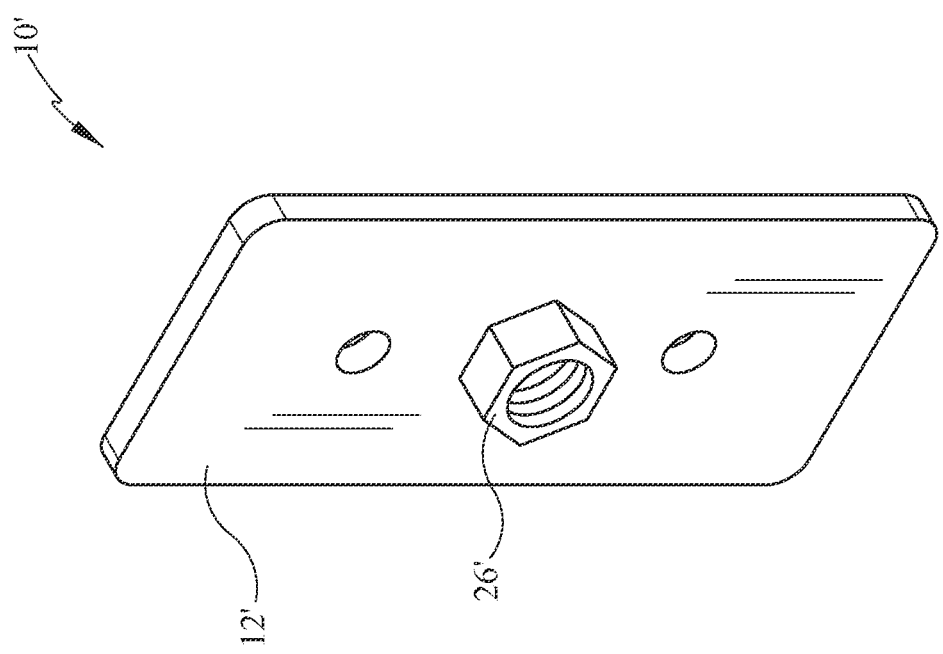
FIG. 9 is a perspective view of the tie-back rod bracket of the present invention formed as a unitary element.

As seen in FIG. 9, the tie-back rod bracket 10' of the present invention may be formed so that the bracket 12' and the first nut 26' are formed as a single integral (indeed monolithic) unit by being cast as this single unit. In all other respects the tie-back rod bracket 10' of FIG. 9 functions in exactly the same manner as the previously described system.

While the invention has been particularly shown and described with reference to an embodiment thereof, it will be appreciated by those skilled in the art that various changes in form and detail may be made without departing from the spirit and scope of the invention.

I claim:

1. A tie-back system comprising:
   a bracket having a front face and a corresponding rear face, the bracket having a central opening, the bracket attached to and in combination with a tie-back piling, by passing a lag bolt through the bracket and then into the tie-back piling, the tie-back piling being anchored within the ground, below the top surface of the ground, the tie-back piling having a tie-back piling opening passing therethrough, such that the central opening of the bracket corresponds with the tie-back piling opening;
   a threaded nut having a nut opening fixedly attached to the front face of the bracket such that the nut opening corresponds with the central opening of the bracket; and
   a threaded tie-back rod having a portion adapted to pass through the tie-back piling opening of the tie-back piling, pass through the central opening of the bracket, and threadably pass through the nut opening of the first nut.

2. The tie-back system as in claim 1 wherein the nut is welded to the front face of the bracket.

3. The tie-back system as in claim 1 wherein the bracket and the nut are formed as a single integral unit.

4. The tie-back system as in claim 3 wherein the bracket and the nut are monolithic.

\* \* \* \* \*